(12) United States Patent
Royce

(10) Patent No.: US 12,373,747 B2
(45) Date of Patent: Jul. 29, 2025

(54) AUTOMATIC MAPPING APPLICATION FOR SERVICE PROVIDERS

(71) Applicant: Aptive Environmental, LLC, Provo, UT (US)

(72) Inventor: Derrick Royce, Provo, UT (US)

(73) Assignee: APTIVE ENVIRONMENTAL, LLC, Provo, UT (US)

(*) Notice: Subject to any disclaimer, the term of this patent is extended or adjusted under 35 U.S.C. 154(b) by 96 days.

(21) Appl. No.: 17/110,076

(22) Filed: Dec. 2, 2020

(65) Prior Publication Data

US 2021/0166172 A1 Jun. 3, 2021

Related U.S. Application Data

(60) Provisional application No. 62/943,196, filed on Dec. 3, 2019.

(51) Int. Cl.
*G06Q 10/0631* (2023.01)
*H04W 4/029* (2018.01)

(52) U.S. Cl.
CPC ...... *G06Q 10/06311* (2013.01); *H04W 4/029* (2018.02)

(58) Field of Classification Search
CPC ... H04W 4/02; G06Q 10/06311; G06Q 30/02; G06Q 10/06; G06Q 30/0207;
(Continued)

(56) References Cited

U.S. PATENT DOCUMENTS 6,198,431 B1    3/2001  Gibson
8,676,620 B2 *  3/2014  Hunt .................... G06Q 10/00
                                                705/7.42
(Continued)

FOREIGN PATENT DOCUMENTS

CN    104052964 A    9/2014
CN    105741376 A    7/2016
(Continued)

OTHER PUBLICATIONS

Zhang Fengli, He Xinggao, Qin Zhiguang and Zhou mingtian, "Location management in mobile environment," 2004 International Conference on Communications, Circuits and Systems (IEEE Cat. No.04EX914), Chengdu, China, 2004, pp. 1491-1496 vol. 2, doi: 10.1109/ICCCAS.2004.1346457. (Year: 2004).*

(Continued)

*Primary Examiner* — Jerry O'Connor
*Assistant Examiner* — Michael R Koester
(74) *Attorney, Agent, or Firm* — Workman Nydegger

(57) ABSTRACT

Mobile computing systems and method for generating a map and associate tasks with their respective positions on the map. First, the mobile computing system is configured to determine a location of itself and generate a map of an area including the determined location. Further, a movement of the mobile computing system is tracked and updated on the map. The mobile computing system is further configured to receive an indication that a task is completed. In response to the indication that the task is completed, a position tag associated with the completed task is generated based on a current location, and the map is updated to include the position tag. The updated map and information related to the completed task are then stored in a computer-readable media.

14 Claims, 13 Drawing Sheets

(58) Field of Classification Search
CPC .......................... G06Q 30/06; G06Q 30/0643; G06F 16/9537; G06F 3/011
See application file for complete search history.

(56) References Cited

U.S. PATENT DOCUMENTS

| | | | |
|---|---|---|---|
| 8,712,686 | B2 | 4/2014 | Bandyopadhyay et al. |
| 8,930,458 | B2 | 1/2015 | Lewis |
| 9,760,573 | B2 | 9/2017 | Guzik |
| 2012/0158365 | A1* | 6/2012 | Lord ................ G06Q 50/02 702/187 |
| 2013/0090965 | A1* | 4/2013 | Rivere ............ G06Q 10/06311 705/7.15 |
| 2014/0244329 | A1* | 8/2014 | Urban ............ G06Q 10/063114 705/7.15 |
| 2015/0066557 | A1* | 3/2015 | Lichti ............ G06Q 10/06311 705/34 |
| 2015/0110459 | A1 | 4/2015 | Reed |
| 2017/0215071 | A1* | 7/2017 | Jayanthi ................ H04W 4/02 |
| 2018/0240055 | A1* | 8/2018 | Theus ................ G06Q 50/163 |
| 2019/0168034 | A1* | 6/2019 | Conboy ................ A62C 3/00 |
| 2020/0053957 | A1* | 2/2020 | Rabby ................ G06Q 50/02 |
| 2022/0035344 | A1* | 2/2022 | Li ...................... A01M 7/0089 |

FOREIGN PATENT DOCUMENTS

| | | | |
|---|---|---|---|
| KR | 20180092682 A | * 8/2018 | |
| WO | WO-2014156940 A1 | * 10/2014 | ....... G06Q 10/06311 |
| WO | WO-2019185930 A1 | * 10/2019 | ........... A01D 34/008 |

OTHER PUBLICATIONS

"Field Operations Productivity Tracking with Pest Control Scheduling Software", available on https://www.pestpac.com/field/productivity-tracking/.

"Pest control software to schedule, quote, route and more", available on https://www.realgreen.com/industries/pest-control-software.

Pablo, et al., "Fleets of robots for environmentally-safe pest control in agriculture", Precision Agriculture, vol. 18, No. 4, (2017), pp. 574-614.

* cited by examiner

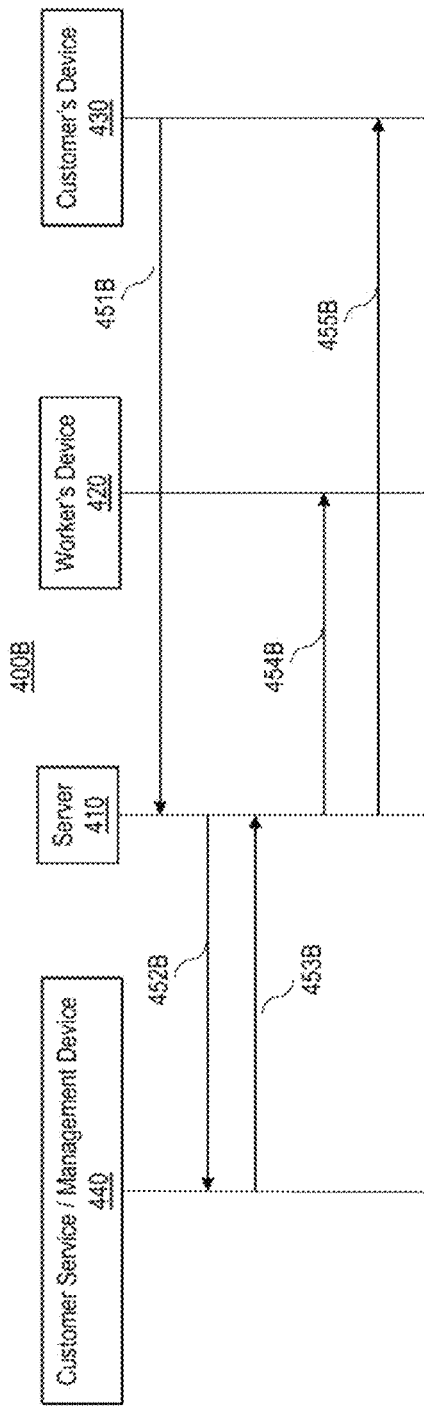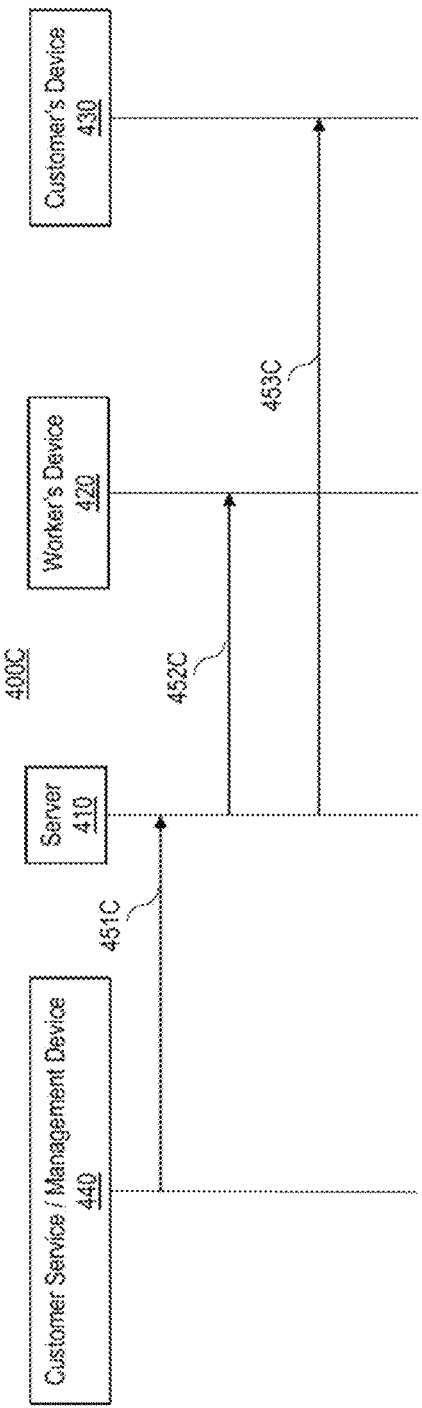

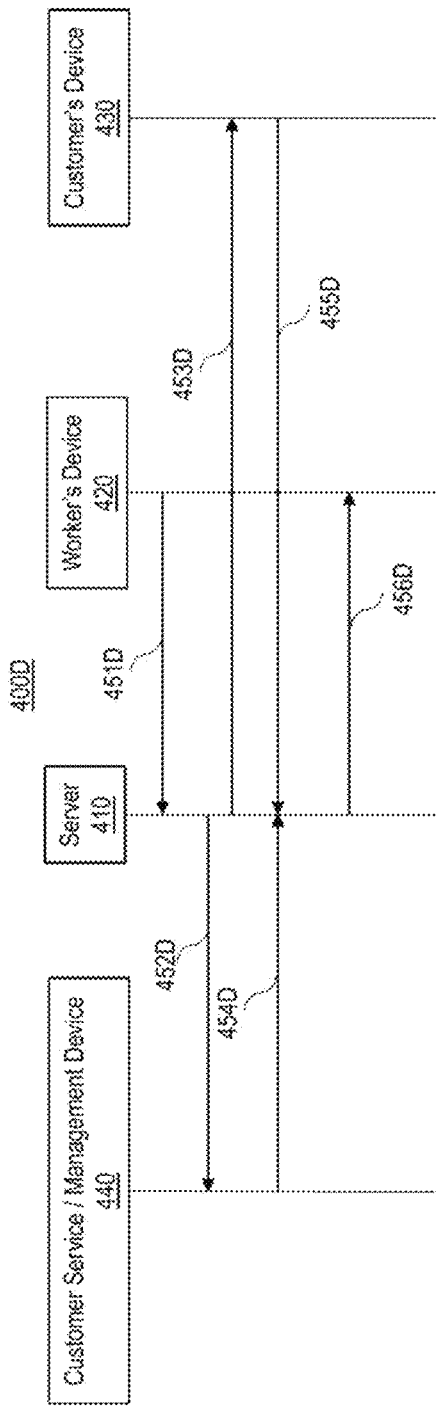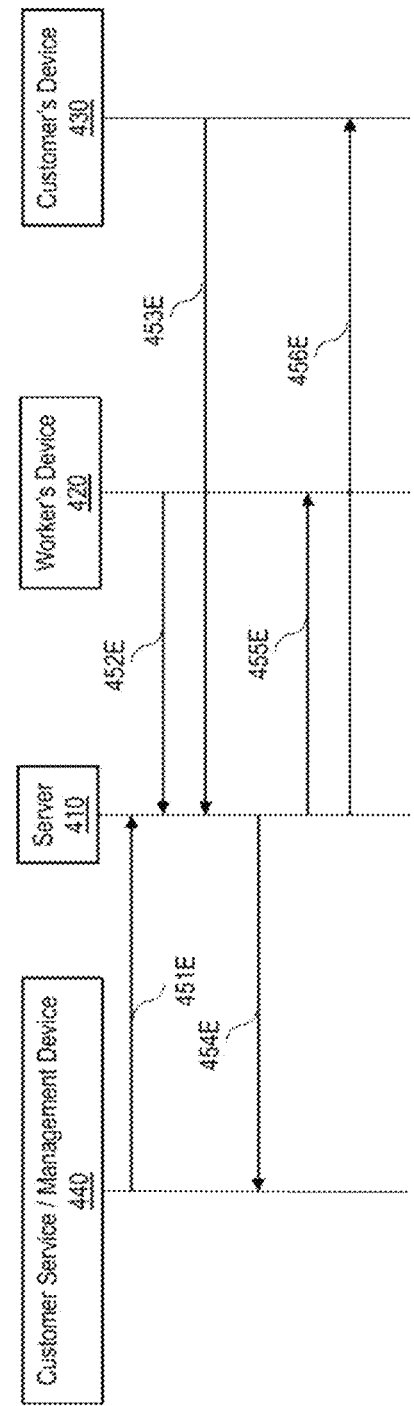
FIG. 4D
FIG. 4E

| Customer ID 702 | Customer Name 703 | Property Address 704 | Due Date 705 | Assignment 706 | Tasks 707 | Status 708 |
|---|---|---|---|---|---|---|
| 12345678 709 | Joe Smith 710 | 123 Main St. City, State 711 | 9/20/2019 712 | Worker A 713 | Property Inspection 714 | Completed on xx/xx/xxxx 715 |
| | | | | | | |
| | | | | | | |
| | | | | | | |
| | | | | | | |
| | | | | | | |
| | | | | | | |

FIG. 7

AUTOMATIC MAPPING APPLICATION FOR SERVICE PROVIDERS

CROSS-REFERENCE TO RELATED APPLICATIONS

This application claims the benefit of and priority to U.S. Provisional Patent Application Ser. No. 62/943,196 filed on Dec. 3, 2019 and entitled "AUTOMATIC MAPPING APPLICATION FOR SERVICE PROVIDERS," which application is expressly incorporated herein by reference in its entirety.

BACKGROUND

Homeowners often need to hire service providers or contractors to perform certain property maintenance work or services, including (but not limited to) pest control, landscaping, property maintenance, tree, and shrubbery insecticide treatment, fertilizer and weed control application, swimming pool maintenance, electrical work, mechanical work, and plumbing work. When a homeowner requests service from such a provider, he/she often discusses his/her needs with a customer service representative (or the contractor) and provides a list of tasks to the sales representative, customer service representative, service provider, or the contractor. These tasks may include additional specific details. For example, a homeowner may require certain tasks to be performed in specific ways, or require that some tasks be performed at a precise location on the property. The tasks may then be assigned to a particular group of employees or subcontractors (hereinafter referred to as "workers"). The workers, once hired or assigned to a task, will go to the property and carry out the task. After the tasks are completed, the workers may need to report back to their management the completion of the tasks.

Some customers may have very specific demands, and such demands may be incorrectly communicated to the workers, resulting in erroneous work. In such a case, the workers may have to return to the property and redo the task(s) free of additional fees.

Additionally, a customer may agree to leave their fence open, remove locks, or leave a key somewhere so the workers may access the property or secure pets. But sometimes, when the workers arrive at the property, they discover that they are unable to access the necessary area, or that an unleashed pet is in the yard or the home, thus rendering performance of the scheduled tasks impossible.

Completion of some tasks is obvious, as the final product of a freshly painted house or a newly constructed fence. When such a task is finished, a homeowner can see that the house has been painted or the fence has been built. Other finished tasks are not as visible, e.g., applying pest control, fertilizers, or weed control. When a worker treats for pests on a property, the customer may be unable to see what has been done or if it has been done in the area the customer requested. When customers do not know or cannot see the treatment process, they may become dissatisfied with the service and cancel their contract with the provider.

The subject matter claimed herein is not limited to embodiments that solve any disadvantages or that operate only in environments such as those described above. This background is only provided to illustrate one exemplary technology area where some embodiments described herein may be practiced.

BRIEF SUMMARY

This Summary introduces a selection of simplified concepts in the claimed subject matter, further described below in the Detailed Description. This Summary is not intended to identify key features or essential features of the claimed subject matter, nor is it intended to be used as an aid in determining the scope of the claimed subject matter.

At least some embodiments described herein relate to mobile computing systems and methods for generating an electronic map, including pinpointing the location where service is (or is to be) performed, and also associating service tasks with the respective positions on the maps. The mobile computing system is configured to determine a location of itself and to generate a map of an area, including the determined location. The mobile computing system is also configured to track a movement of itself and update the map of the area to illustrate the tracked movement. After tracking movement, an indication indicating that a task is completed may be received. For example, the worker may input the indication indicating that the task is completed. In response to the indication that the task is completed, a position tag is generated by the mobile computing system based on the current position of the system. A position tag is a label that includes one or more attributes. At least one of the attributes is associated with a position on the generated electronic map. The position tag is then associated with the completed task. The map is then updated to include the position tag. Finally, the updated map is stored in a computer-readable media. In some embodiments, the computer-readable storage may include a cloud storage.

In some embodiments, the mobile computing system may further be configured to store pinpoint locations for where recurring tasks are (or are to be) performed.

In some embodiments, the mobile computing system may further be configured to display multiple tasks, and the completed task may be one of the multiple tasks.

In some embodiments, the mobile computing system may further be configured to receive an indication that the task is started and associate a current position with the starting point of the task. The mobile computing system may then associate a portion of the tracked movement between the starting point and the completion point to the task. Accordingly, the portion of the tracked movement corresponds to the path of the movement of the mobile computing system during the period of time when the task is being completed. In some embodiments, the portion of the tracked movement may be colored in a different color from the remainder of the tracked movement.

In some embodiments, the mobile computing system may further be configured to display information related to a customer. The displayed information may include a physical address corresponding to the customer. The displayed information may include certain preference of the customer relating to the task or tasks. The mobile computing system may also determine that the physical address corresponding to the customer matches the current location of the mobile computing system.

In some embodiments, the mobile computing system may be further configured to access a cloud storage that contains information related to one or more customers, and retrieve and display a particular customer's information. The customer's information includes at least one physical address, and each of the one or more physical addresses corresponds to one or more tasks and/or preferences. At least one of the physical addresses and the corresponding tasks may be displayed at the mobile computing system. The mobile computing system may also be configured to update the particular customer's information stored at the cloud storage to include the generated map and the completed task.

In some embodiments, the mobile computing system may further be configured to determine that the location of the mobile computing system matches a customer's physical address that is stored at the cloud storage.

In some embodiments, the mobile computing system may further be configured to receive an indication that a second task has started, and generate a second start position tag associated with a second start position once the second task has started. Thereafter, an indication indicating that a second task is complete and generate a second completion tag associated with a second completion position when the second task is completed. For example, when the worker finishes the second task, the worker may input the indication on the display of the mobile computing system to indicate that the second task is completed. The mobile computing system then associates a second portion of the tracked movement of the mobile computing system between the second start position and the second completion position within the completed second task, so that the second portion of the tracked movement corresponds to the path of the movement of the mobile computing system during a second period of time when the second task is performed. In some embodiments, the mobile computing system may further color the first portion of the tracked movement that corresponds the first task, and the second portion of the tracked movement that corresponds to the second task in different colors.

Further, at least some embodiments described herein relate to a computer server for managing tasks performed, or to be performed, by service providers using generated maps. In some embodiments, the computer server is configured to receive information associated with a customer from a computing system. The information associated with the customer includes a physical address. In response to receiving the physical address, the computer server causes a visualization containing a map corresponding to the physical address to be displayed at the computing system. The visualization allows one or more position tag(s), each of which is associated with one or more tasks, to be annotated on the map. When the computer server receives one or more position tag(s) annotated on the map of the visualization, the computer server stores the information associated with the customer, including the annotated map in a data storage.

In some embodiments, the computer server is further configured to maintain the data storage that contains information related to one or more customers. Each customer is associated with at least one physical address, and each physical address is associated with at least one task. The computer server is also configured to send information related to at least one of the customers to a second computing system. The sent information includes at least a corresponding physical address and the corresponding one or more tasks. The computer server is also configured to receive an indication from the second computing system that at least one of the corresponding one or more tasks is updated. The indication includes a map of the corresponding physical address and a position tag that is associated with the task. In response to receiving the indication, the computer server is configured to update the customer's information based on the received indication.

In some embodiments, the second computing system may be configured to be accessible by a customer corresponding to the physical address. In some embodiments, the second computing system may be a mobile computing system that is being carried by a worker when the worker is performing the at least one of the one or more tasks. In some embodiments, the computer server may further be configured to receive, from the mobile computing system, information related to a physical location of the mobile computing system. When it is determined that the location of the mobile computing system matches one of the one or more physical addresses, the information corresponding to the one of the one or more physical addresses is sent to the mobile computing system.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not to be considered to be limiting in scope, embodiments will be described and explained with additional specificity and details through the use of the accompanying drawings in which:

FIGS. 4B-4E illustrate various example communication patterns among a customer's device, a worker's device, a customer service/management device, and a server;

FIG. 7 illustrates an example main menu user interface that shows a table including multiple customers' information;

DETAILED DESCRIPTION

Figure 1:
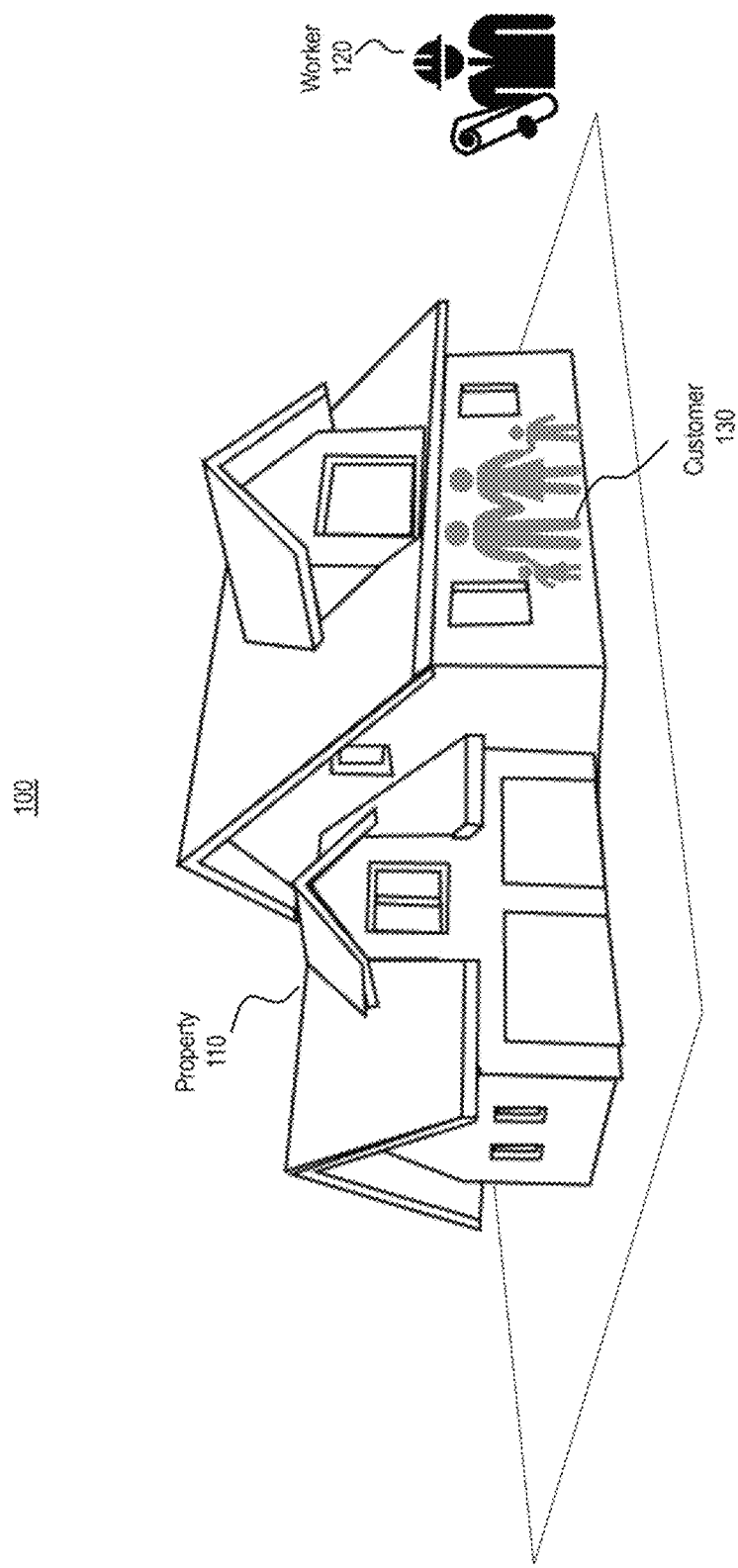
FIG. 1 illustrates an example real-life environment, in which the principles described herein may be employed.

At least some embodiments described herein relate to mobile computing systems and methods for generating an electronic map, including pinpointing the location where service is (or is to be) performed, and also associating service tasks with the respective positions on the maps. The mobile computing system is configured to determine a location of itself and to generate a map of an area, including the determined location. The mobile computing system is also configured to track a movement of itself and update the map of the area to illustrate the tracked movement. After tracking movement, an indication indicating that a task is completed may be received. For example, the worker may input the indication indicating that the task is completed. In response to the indication that the task is completed, a position tag is generated by the mobile computing system based on the current position of the system. The position tag is then associated with the completed task. The map is then updated to include the position tag. Finally, the updated map is stored in a computer-readable media. In some embodiments, the computer-readable storage may include a cloud storage.

In some embodiments, the mobile computing system is configured to determine a location of itself and to generate a map of an area, including the determined location. The mobile computing system is also configured to track a movement of itself and update the map of the area to include the tracked movement. Thereafter, an indication indicating that a task is completed may be received. In response to the indication that the task is complete, a position tag is generated based on the current position of the mobile computing system. The position tag is then associated with the completed task. The map is then updated to include the position tag. Finally, the updated map is stored in a computer-readable media. In some embodiments, the computer-readable storage may include a cloud storage.

The mobile computing system may further be configured to display multiple tasks, and the completed task may be one of the multiple tasks. The mobile computing system may further be configured to receive an indication that the task has started and associated a current position with the starting point of the task. The mobile computing system may then associate a portion of the tracked movement between the starting point and the completion point with the completed task. Accordingly, the portion of the tracked movement may correspond to a path of the movement of the mobile computing system during a period of time when the task was being completed. In some embodiment, the portion of the tracked movement may be colored in a different color from the remainder of the tracked movement.

In some embodiments, the mobile computing system is configured to display information related to a customer. The displayed information may include a property address corresponding to the customer. The mobile computing system may also determine that the property address corresponding to the customer matches a current location of the mobile computing system.

The mobile computing system may access a cloud storage that contains information related to one or more customers, and retrieve and display a particular customer's information. The customer's information includes at least one or more physical addresses, and each of the one or more physical addresses corresponds to one or more tasks. At least one of the one or more physical addresses and the corresponding one or more tasks may be displayed at the mobile computing system. The mobile computing system may also be configured to update the particular customer's information stored in the cloud storage to include the generated map and the completed task. The mobile computing system may further be configured to determine that the location of the mobile computing system matches a customer's physical address stored by the cloud storage.

In some embodiments, the mobile computing system may be used to map more than one task. For example, the mobile computing system may receive an indication that a second task has started. In response to this indication, the mobile computing system generates a second start position tag associated with a second start. Upon task completion, the mobile computing system receives an indication that the second task is complete. The mobile computing system then generates a second completion tag associated with the second completion position when the second task is finished.

The mobile computing system is configured to then associate the second portion of the tracked movement of the mobile computing system between the second start position and the second completion position with the completed second task, so that the second portion of the tracked movement corresponds to the same path of movement of the mobile computing system during the second period of time when the second task is performed. In some embodiments, the mobile computing system colors the first portion of the tracked movement that corresponds to the first task a first color, and the second portion of the tracked movement that corresponds to the second task a second color. As such, a user viewing the map will see a first color pathway that represents the movement of the mobile computing system during the first task and a second color pathway that represents the movement of the mobile computing system during the second task.

Further, at least some embodiments described herein relate to a computer server for managing tasks performed, or to be performed, by service providers using generated maps. In some embodiments, the computer server is configured to receive information associated with a customer from a computing system. The information associated with the customer includes a physical address and may include preferences regarding recurring tasks. In response to receiving the physical address, the computer server causes a visualization containing a map corresponding to the physical address to be displayed at the computing system. The visualization allows one or more position tag(s), each of which is associated with one or more tasks, to be annotated on the map. When the computer server receives one or more position tag(s) annotated on the map of the visualization, the computer server stores the information associated with the customer, including the annotated map in a data storage.

In some embodiments, the computer server is further configured to maintain the data storage that contains information related to one or more customers. Each of the customers is associated with at least one physical address, and each physical address is associated with at least one task. The computer server is also configured to send information related to at least one of the one or more customers to the mobile computing system. The sent information includes at least a corresponding physical address and the corresponding one or more tasks. The computer server is also configured to receive an indication, from the mobile computing system, when at least one of the corresponding one or more tasks is updated. The indication includes a map of the corresponding physical address and a position tag associated with the task. In response to receiving the indication, the computer server is configured to update the customer's information based on the received indication.

In some embodiments, the computer server provides information that is accessible by a customer corresponding to the physical address. For example, the computer server may communicate the map with colored paths to the customer. The customer can then visually identify the path of the worker while the worker performs tasks at the customer's property. The server may also provide additional information to the customer, such as comments from the worker, pictures from the worker, and other information that is specific to the tasks that the worker is performing.

The principles described herein provide a technical advance to allow customers and management to visually review and manage the services performed on a particular location or property. Further, the principles described herein allow customers and workers the ability to communicate with each other efficiently and clearly. For example, customers may be able to update the details related to their requested services and/or request new services and add annotations on the map of their respective property area(s). The customers can also see the progress of the services related to their respective properties on the annotated map, including tags associated with tasks. The management or customer services may also review and assign tasks to different workers or worker groups with greater efficiency.

FIG. 1 illustrates an example real-life environment 100, in which the principles described herein may be implemented. The environment 100 includes a property 110, a customer 130, and a worker 120. The customer may be the owner or tenant of the property 110. Because a lot of the property improvement and maintenance projects and/or tasks are complex or labor-intensive, homeowners or tenants often prefer to hire a service company or contractor to perform the tasks. Additionally, many homeowners or tenants work during the day, and many service tasks or projects may be performed when the homeowners or tenants are not home. The principles described herein allow customers to see details concerning the progress of the service being performed on their property or properties, even while they are not present.

Figure 2:
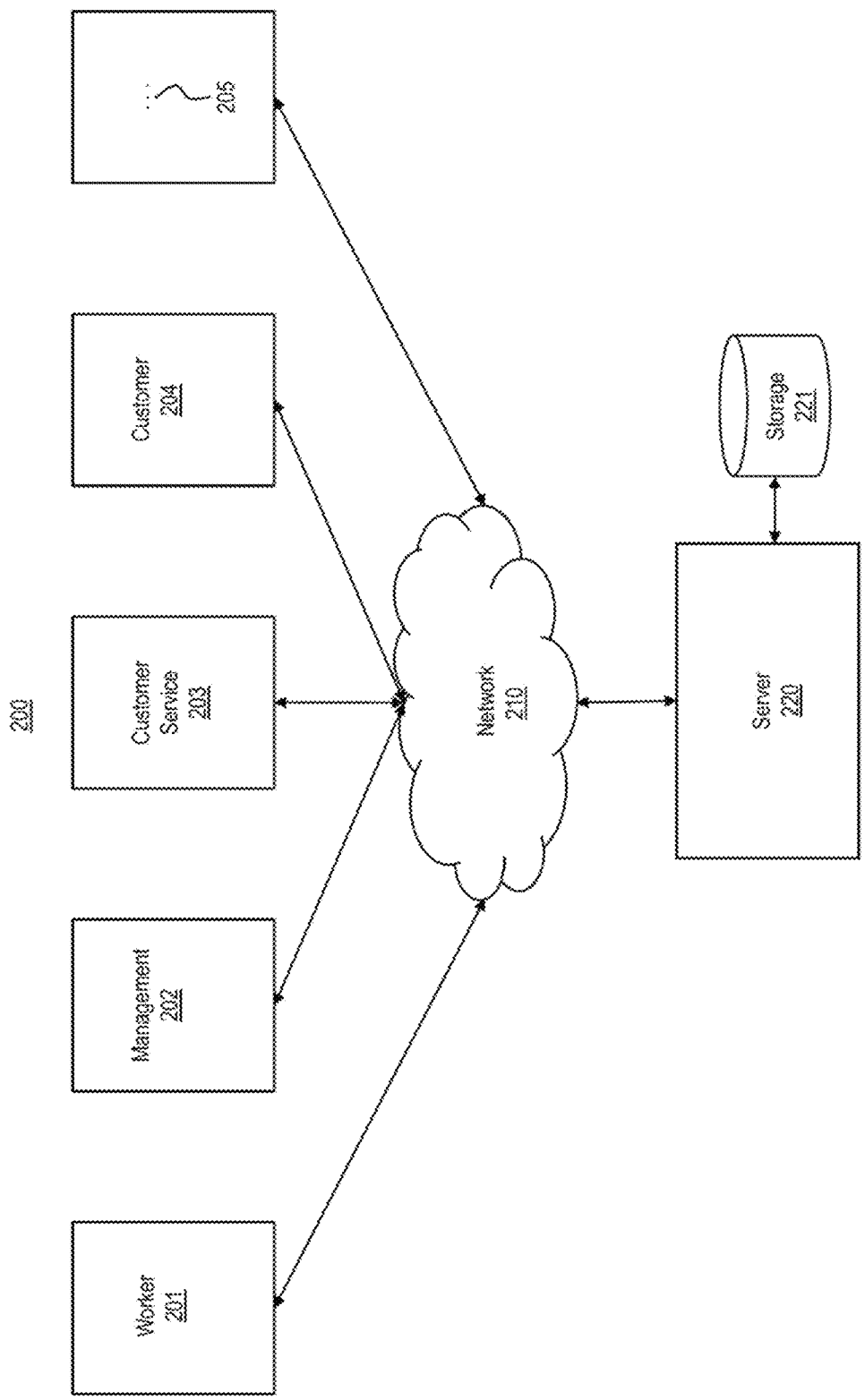
FIG. 2 illustrates an example computing environment, in which different computing devices may be configured to communicate with a server via a computer network.

FIG. 2 illustrates an example of a schematic environment 200, in which the principles described herein may be implemented. The environment 200 includes a server 220 that has access to a storage 221. The storage 221 may be configured to store one or more customers' information. The server 220 may be a management server that hosts and maintains the customers' information stored in storage 221. In some embodiments, the server 220 may be hosted at a cloud service.

As illustrated in FIG. 2, various computing systems may be able to communicate with the server 220 via a computer network 210. The various computing systems may include one or more computing systems accessible by respective workers 201, one or more computing systems accessible by management or managers 202, one or more computing systems accessible by customer service 203, and one or more computing systems accessible by the customers 204. The ellipsis 205 represents that there may be computing systems accessible by additional parties that may communicate with the server 220 via the network 210.

The server 220 may host a task management system that provides different parties with different roles. Each role may have a different level of access to information. The user interface of one role may be different from the user interface of another role. For example, the management and customer service may have access to all of the customer information, whereas a customer may only have access to information related to his/her own property, and the workers may only have access to information related to their assigned tasks.

Figure 3:
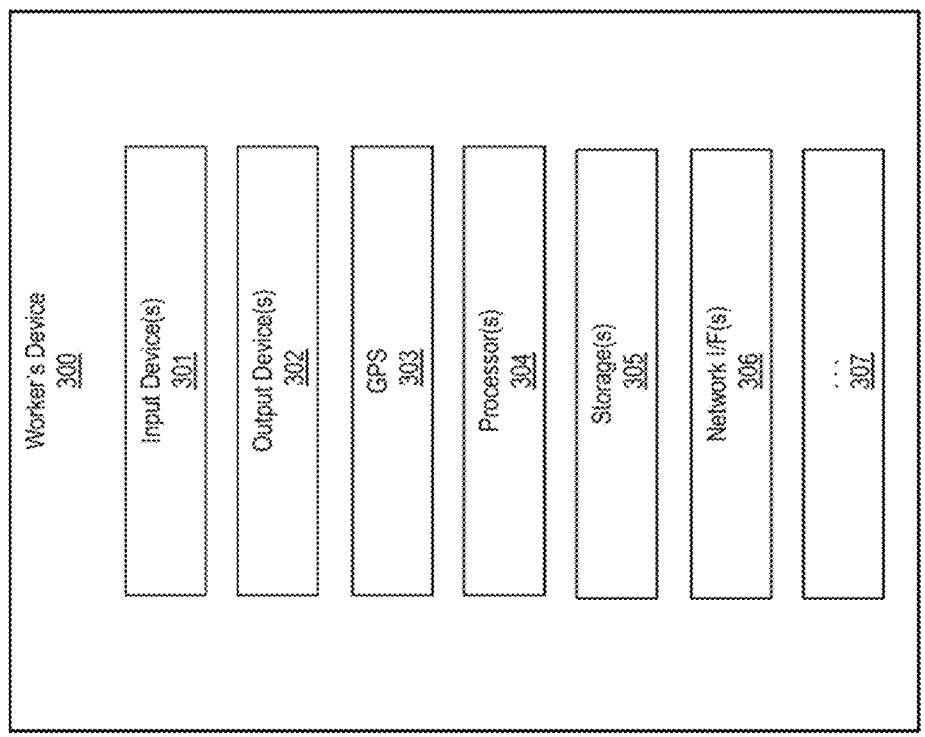
FIG. 3 illustrates an example mobile computing device that a worker may carry and use when a task is being performed.

FIG. 3 illustrates an example of a device 300 that may be carried and used by a worker. The worker's device 300 may be any type of computing device, including (but not limited to) a mobile phone, a tablet, or a laptop. The worker's device 300 may include one or more input device 301, one or more output device 302, a global positioning system (GPS) 303, one or more processors 304, one or more computer-readable storages, and one or more network interfaces 306. The one or more input devices 301 may include (but are not limited to) a touch screen, a keyboard, a mouse, and a microphone. The one or more output devices 302 may include (but are not limited to) a display and a speaker. In some embodiments, the worker's device 300 may include or be coupled to a printer as an output device. In some embodiments, the GPS 303 may be a satellite-based navigation system. Alternatively, or in addition, the GPS may also use a 3G or 4G network or internet network (e.g., WIFI or LAN) to determine its position.

The one or more processors 304 may be any type of computer processor including (but not limited to) different types of CPUs, microprocessors, application-specific instruction-set processors (ASIP), graphics processing units (GPU), physics processing units (PPU), digital signal processors (DSP), image processors, coprocessors, floating-point units, network processors, multi-core processors, and front end processors.

The one or more network interfaces 306 may include various network interfaces using different network channels and standards, including (but not limited to) Ethernet, WIFI, Bluetooth, 3G and 4G networks. The ellipsis 307 represents that there may be additional components included in the worker's device 300.

Figure 4A:
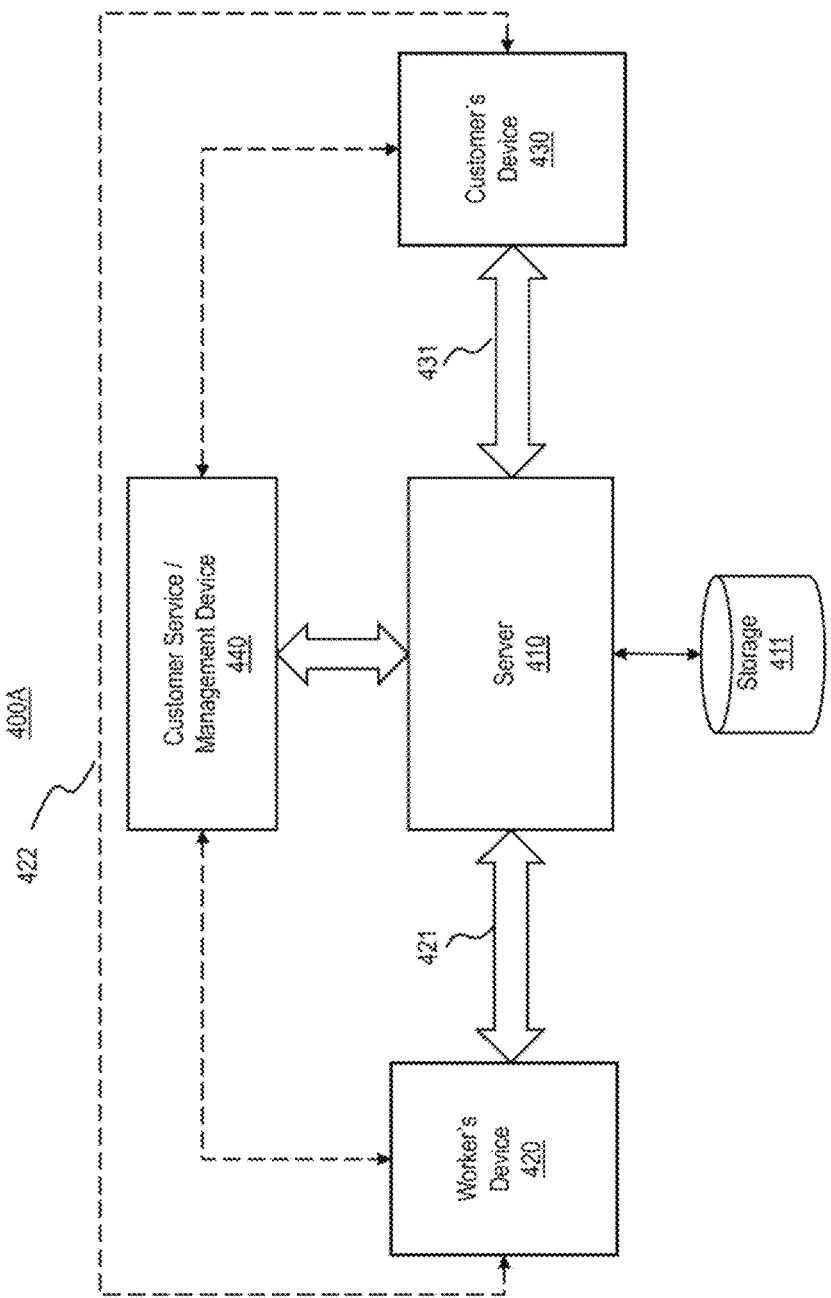
FIG. 4A illustrates an example computing environment, in which the principles described herein may be implemented.

FIG. 4A illustrates an example of a system 400 through which the principles described herein may be implemented. The system 400 includes a server 410, one or more worker's device(s) 420, one or more customer's device(s) 430, and one or more customer service and/or management device(s) 440. Each of the worker's device(s) 420, customer's device(s) 430, or customer service/management device(s) 440 may be a computing system configured to access data stored in a storage 411 via the server 410. The storage 411 may include data of a plurality of tasks associated with a plurality of customers. Some of the plurality of tasks may be to-do tasks that are to be completed by one or more workers. Some of the plurality of the tasks may have been completed. Some other tasks may be potential tasks that prospective customers may be interested, but have not yet committed. In some embodiments, each of the worker's device(s) 420, customer's device(s) 430, and customer service/management device(s) 440 is allowed to access a portion of the data stored in the storage 411 via a native application or a web application. For example, in some embodiments, each customer's device 430 is only allowed to access task data associated with the corresponding customer's property, each worker's device 420 is only allowed to access task data assigned to the corresponding worker, each management device 440 is only allowed to access task data assigned to the corresponding management team, and each customer service device 440 or some management device 440 may be allowed to access all the task data.

Various communication patterns may occur amongst the worker's device(s) 420, the customer's device(s) 430, the customer service/management device(s) 440, and the server 410. FIGS. 4B-4E illustrate a few example communication patterns 400B-400E that may occur in different circumstances or setup.

Referring to FIG. 4B, in the communication pattern 400B, a customer may initiate an inquiry associated with a task. Such an inquiry is input from the customer's device 430 to the server 410 (represented by arrow 451B). In some cases, the inquiry may merely be a question, a phone number, or an email address. In some cases, the customer may input a property address and specific task associated with the corresponding property. For example, in some embodiments, the application installed at the customer's device is configured to display a map of the corresponding property and/or a list of available tasks. The customer can annotate the map and/or select one or more tasks, indicating one or more locations at the property associated with one or more requested tasks.

Once the customer's device finishes the entering of the inquiry, the server 410 would store the received inquiry in the storage 411, which is accessible by the customer service/management device 440 (represented by arrow 452B). In some embodiments, the server 410 may send a notification to the customer service/management device 440 when a new customer inquiry is received. Alternatively, or in addition, the customer service/management device 440 is configured to poll the server 410 at a predetermined frequency (e.g., every minute, every 5 minutes, etc.) to determine whether a new inquiry has been received. The customer service/management would review the newly received customer inquiry and determine whether a new task is to be performed or additional clarification from the customer is required. When a new task is identified or clarified, the customer service/management may update the information associated with the customer's inquiry and/or assign the task to a worker. The update is input from the customer service/management device 440 to the server 410 (represented by arrow 453B).

After the server 410 receives the updated information or the assignment to a particular worker, the server 410 may generate a notification to the worker's device 420. Alternatively, or in addition, the worker's device 420 may be configured to poll the server 410 at a predetermined frequency (e.g., every minute, every 5 minutes, etc.) to determine whether a new task is assigned. The worker's device 420 is configured to access the task data assigned to the corresponding worker via the server 410 (represented by arrow 454B). At the same time, the server 410 may also send a notification to the customer's device 430 to notify the customer that their task has been assigned to a particular worker (e.g., providing direct contact information to the customer). In some embodiments, when the task has been scheduled at a particular time, the server 410 notifies the customer of the scheduled time.

FIG. 4C illustrates another example communication pattern 400C that may occur among the customer service/management device(s) 440, customer's device(s) 430, the worker's device(s) 420, and the server 410. As illustrated, a customer may call the customer service to ask questions or request service. The customer service would record the customer's information from the customer service device 440 to the server 410 (represented by arrow 451C). For example, in some embodiments, when a property address of the customer is entered into the customer service device 440, the customer service device 440 is configured to display a map corresponding to the property address and/or a list of tasks that may be performed. The customer service representative can annotate the map and/or select one or more tasks, indicating one or more locations on the map that are associated with one or more tasks.

Once a task is generated, the customer service may also assign the task to a particular worker, which may similarly trigger the server 410 to generate a notification to the worker's device 420 and/or the customer's device 430 (represented by arrows 452C, 453C). In some embodiments, the notification merely provides contact information to the customer and the worker to allow them to communicate with each other directly. In some embodiments, the notification further includes a quote of the task(s) and a tentative time that the task is to be performed.

FIG. 4D further illustrates another example of a communication pattern 400D. Referring to FIG. 4D, a worker's device 420 may initiate a new entry of task or update a status of an existing task (represented by arrow 451D). Once the task is entered or updated, both the customer service/management device 440 and the corresponding customer's device 430 is able to access the data entered by the worker (which is represented by arrows 452D, 453D). For example, after a worker completes a task, or inspect a property, the worker may update the status of the task as completed or generate a new entry of task. After receiving the worker's entry, each of the service/management device 440 or the customer's device 430 may further provide feedback(s) (represented by arrows 454D, 455D). After receiving the feedback(s) from the customer service/management device 440 or the customer's device 430, the worker's device 420 may receive a notification from the server 410 or access the feedback via the server 410 (represented by arrow 456D).

FIG. 4E further illustrates an example of a communication pattern 400E. As illustrated in FIG. 4E, each of the customer service/management device 440, the worker device 420, and the customer's device 430 is configured to provide input(s) into the server 410 (represented by arrows 451E, 452E, 453E). At the same time, each of the customer service/management device 440, and the worker device 420 is configured to access the data input by other relevant parties (represented by arrows 454E, 455E, 456E). For example, when the customer service/management device 440 updates a particular task associated with a particular customer and assigned to a particular worker, the corresponding worker's device and the corresponding customer's device can access the updated task. Similarly, when a customer generates an input associated with a task, the worker assigned to the task, and the customer service would also be able to access such an input.

Note, the communication patterns illustrated in FIGS. 4B-4E are merely a few examples. Other communication patterns may occur. For example, when a new task is generated, the task may be sent to multiple workers who are based within a predetermined radius from the property associated with the task. Each of the multiple workers may accept or reject the task. In some embodiments, a worker who accepts the task the first would be awarded the task. In some other embodiments, each worker may be allowed to enter a date or time that the worker can perform the task, and the task is awarded to the worker who can perform the task the soonest. In yet some other embodiments, each worker may be allowed to submit a bid, and the task may be awarded to the worker who submitted the lowest bid. As another example, after a task is assigned to a particular worker, the particular worker may be allowed to reassign the task (or a portion of the task) to another worker via the system 400. Once the task or a portion of the task is reassigned to the other worker, the other worker's device would have access to the data associated with the task.

Further, the communications in each of the communication patterns of FIGS. 4B-4E are not required to be in a specific order unless one communication depends on the occurrence of another communication. For example, as illustrated in FIG. 4E, it is not necessary that the customer service/management device 440 accesses data via the server 210 prior to the customer's device accesses the data.

The worker's device 420 may correspond to device 300 illustrated in FIG. 3. The worker's device 420 may be a mobile computing system, e.g., mobile phone, tablet, laptop, etc. The worker's device 420 is configured to determine its position. For example, device 420 may include a GPS (similar to the GPS 303 of FIG. 3). When a worker carries the device 420 at work, the determined location will match the location of the worker.

The worker's device 420 is also configured to generate a map of an area that includes the determined position. Different embodiments may be implemented for determining the size and/or shape of the area of the generated map. In some embodiments, the map may use the determined position as the center of the map, and may generate a map of an area that has a predetermined size, e.g., 1 acre, 0.5 acres, 100 ft.×100 ft., etc. In some embodiments, the map may use the determined position to retrieve the property's boundary from a data system that records property boundaries (e.g., county property record database) and display an area of the map to include the boundary of the property.

The worker's device 420 is also configured to track a movement of itself. In some embodiments, the worker's device 420 may update its current position at a predetermined frequency, e.g., per second or per minute, and record the updated positions at the predetermined frequency with a corresponding timestamp. In some embodiments, the worker's device 420 may update its current position based on a movement threshold. Only when a newly determined position and a previously determined position are more than a predetermined threshold away will the newly determined position be recorded with a timestamp. The recorded movement may then be displayed on the map.

Further, the worker's device 420 may also be configured to receive an indication that a task is complete. For example, the worker 423, who carries the device, may input an indication at the touch screen of the device 420 to indicate a completed task. In response to the indication of task completion, the worker's device 420 may generate a position tag based on its current position and associate the position tag with the completed task. Further, the map may also be updated to include the position tag.

In some embodiments, a portion of the tracked movement of the worker's device 420 may also be associated with a completed task. That portion of the tracked movement may correspond to the path of the worker during a period of time when the task is performed. In some embodiments, the worker may enter a start input when a task is commenced, in addition to the completion input when the task is finished. Thus, the portion of the tracked movement between the start time and the completion time may also be associated with the completed task. This portion of the tracked movement may also be displayed on the map. In some embodiments, the portion of the tracked movement that is associated with a particular completed task may be colored a different color than the remainder of the tracked movement on the map. Alternatively, or in any combination, the portion of the tracked movement that is associated with a particular completed task may be drawn on the map using a different font of a line (e.g., dotted line, double line, thicker or thinner line, etc.).

After a first task is completed, the worker may begin work on a second task. Similarly, the worker's device may track the worker's start and end positions of the second task. When the second task is completed, a position tag and/or a portion of the tracked movement may be associated with the completed task and displayed on the map. The position tag and/or the portion of tracked movement associated with the second task may be colored a different color and/or drawn in a different font than those associated with the first task.

This process may repeat until all the tasks associated with the property address are completed. Alternatively, one group of workers may only be responsible for a portion of the tasks for the property, and another group of workers may come at a later time to complete another portion of the tasks.

In some embodiments, a first portion of the tracked movement associated with the first task may be colored or shaded in a first color, shade, and/or font, and a second portion of tracked movement associated with the second task may be colored or shaded in a second color, shade and/or font. As such, the portions of the tracked movement corresponding to different tasks may be shown in different colors, shades, or fonts. For example, the first task may be an initial inspection, and the second task may be performing a service to address issues identified during the initial inspection. The worker may first perform the inspection by walking around the property. The portion of the tracked movement of the worker's inspection may be shown in green. After the inspection, the worker may decide to perform service, such as the application of a chemical or removal of a nest in the area inspected. The portion of the movement tracked when performing the service may be shown in red. Alternatively, or in addition, the portion of the movement tracked during the worker's inspection may be shown in a dotted line, a thin line, or shade (e.g., 1 px), and the portion of the tracked movement recorded during application of a chemical or removing a nest may be shown in solid line, a thicker line, or a different shade (e.g., 3 px).

In some embodiments, the system may allow users to display only a portion of the tracked movement that corresponds to a particular task. Showing the particular portion of the tracked movement that only corresponds to one particular task will remove the distractions from the rest of the tracked movement, such that the worker can decide whether all areas have been properly treated under the particular task. For example, the worker may only want to see the portion of the tracked movement for spraying chemical solutions, leaving the untreated area to be easily seen and be treated accordingly.

Further, the worker's device 420 may also allow workers to input custom notes to each task, whether the task is in progress or has been completed. For example, some tasks may be impossible to complete under certain circumstances. In such a case, the worker may input a note associated with the task. The worker's device 420 may also take photos relevant to the tasks. For example, if the pest control worker has trapped a rat, the worker may take a picture of the trapped rat and associate the photo with a position tag indicating the location where the rat was trapped. Additionally, if the pest control worker puts a trap or bait station at a particular location, the worker may also take a picture of the trap or bait station and generate a position tag indicating the location where the trap is set and provide information about the trap.

In some embodiments, the worker's device 420 may also take a picture of a completed project. For example, a particular portion of the siding of the property may need to be replaced. After the portion of the siding is replaced and repainted, the worker may take a picture of the portion of the new siding and associate the picture with the completed task.

In some embodiments, the worker's device 420 may also keep a record of tools or chemicals used to complete the project. In some embodiments, the worker may merely take a picture of the tool or chemical when it is used. In other embodiments, each of the tools or chemicals may include an identifying barcode or QR code. The worker's device 420 may be configured to scan the code of the tool or chemical before or after the respective tool or chemical is used. The recorded tool or chemical may then be associated with the task and may also be tagged on the map.

Further, the quantity or rate of application of some chemicals is controlled by law. In some embodiments, the system can determine the type and/or quantity of the chemical that should be applied at a particular location. For example, the system may be configured to determine that a particular quantity of a chemical should be applied to a specific sized and/or shaped area for a specific purpose. The system may also determine that a quantity of one or more chemicals should be applied at one or more specific regions based on the size and shape of the area.

In some embodiments, the shape and size of the area may be obtained from the public record (e.g., county property record) or a third-party resource (e.g., Google map). Alternatively, or in addition, the shape and size of the area may be manually entered by the worker and/or be obtained based on tracking the worker's activities/movements at the property. For example, the system may first generate a local map based on the public record or third-party resource. After that, the worker may then be able to draw a shape on the generated map to indicate the area that is to be treated. Alternatively, or in addition, the system may determine the size and shape of the area based on the worker's movement in the area. For example, the worker may first walk around the area, or do a cursive inspection of the area, and the system may determine the shape and size of the area based on the path the worker took during the cursive inspection. Based on the shape and size of the area, the system may then determine a proper amount of one or more chemicals that should be applied to the area.

The determined proper amount of the one or more chemicals may then be applied to the area or to the specific space in the area. Further, when an amount of chemical is used, the system may require, or be capable of allowing, a worker to record the amount of chemicals used. The amount and the type of the chemical used may also be shown as a tag on the map and may be uploaded to a server and/or cloud.

The updated map and information related to the tasks may then be stored in a computer-readable media. The computer-readable media may be a local storage that is coupled to the worker's device, e.g., the hard drive of a mobile phone, which may correspond to the storage 305 of FIG. 3. The computer-readable media may also be a cloud storage 411 that is hosted at a remote server 410. In some embodiments, the updated map may be stored at a local storage and/or uploaded to the cloud storage automatically after the indication of the completion of the task is received. In some embodiments, the updated map, including the tracked movement of the worker, may be backed up on a local storage and/or a remote server at a predetermined frequency, e.g., every minute, or every 5 minutes.

Referring to FIG. 4, the bi-directional arrow 421 represents that the worker's device 420 and server 410 are capable of communicating with each other via a computer network. The server 410 may be configured to maintain any quantity of customer information at the storage 411. For each customer, the storage 411 may store one or more physical addresses, where each of the physical addresses is associated with one or more tasks. The server 410 may further be configured to send information (related to at least one of the customers) to the worker's device 420.

In some embodiments, the server 410 and/or the worker's device 420 may further be configured to determine whether the worker is at a location that matches the physical address stored in the storage 411 based on the worker's current location received from the worker's device 420. If a matching physical address is found, the server 410 may automatically send to the device 420 information related to the matching physical address.

In some embodiments, the worker 423 may input a customer's physical address into the worker's device 420, and the worker's device 420 then passes on the physical address to the server 410. In response to receiving the inquiry of the customer's physical address, the server 410 may then determine whether the received physical address is one of the physical addresses stored at the storage 411, and if it is, the server 410 would then retrieve the information related to the physical address from the worker's device 420. Alternatively, if no matching physical address is found, the server 410 may send a notification to the worker's device 420 to notify the worker that the physical address does not exist in the system.

In some embodiments, if the worker's input of the physical address does not match the worker's current position, the server 420 may generate a notification or warning to the worker's device 420, so that the worker would not inadvertently perform work on someone else's property.

After the worker's device 420 receives the information related to the inquired physical address, a user interface may be displayed to show a list of the one or more tasks corresponding to the physical address. In some embodiments, the list of one or more tasks may be displayed with checkboxes beside them. The worker may start to work on the list of the tasks one at a time. When one of the tasks is completed, the worker may check the check box next to the completed task to indicate that the task is completed. Further, when the check box is checked, the worker's device 420 may determine the worker's current position, generate a position tag based on the determined position, and associate the position tag with the checked-off task. The generated position tag may then be displayed on the map, corresponding to the physical address. Further, the tracked movement of the worker's device 420 and a portion of the tracked movement associated with the completed task may also be displayed on the map. In addition, if a task on the list has not been completed, then the device would send a notice to the worker regarding the uncompleted task and prevent the worker from opening another task.

The completed task and the updated map may then be sent to the server 410 and stored at the storage 411. For example, the information related to the particular property may be updated with the completed tasks, any notes or pictures, and the updated map. As another example, each customer's information may be stored in a data structure that includes a map record. Each map record may further include a tracking record and/or one or more position tags. Each of the position tags and/or portions of the tracked movement corresponds to a completed task. In some embodiments, the position tags and portions of tracked movement may be stored relationally to the tasks.

After the server 410 updates and/or backs up the information related to the property, the information may also be accessed by other workers, management, customer service team, and/or respective customers 432. The customer 432 may have access to a customer's device 430, which may be any computing system, including (but not limited to) a mobile device, a personal computer, a special application, and a web browser. The arrow 431 represents that the customer's device 430 and the server 410 may communicate with each other via a computer network.

The server 410 may host a separate customer portal, different from the portal that the worker's device has access to. The customer's device 430 may also install an app (e.g., a phone app) and use the app to log in and access the information related to the customer stored at the storage 411 of the server 410. For example, each customer may be assigned to a unique customer ID, which can be used to register a user account. The unique customer ID may be a randomly assigned series of numbers or letters, a consecutive number that increases by one each time a new customer is added, or merely a customer's email address. Once the customer has registered based on the unique customer ID, the customer can access the information related to the one or more properties associated with the customer account. For example, a property owner may own more than one property. When the property owner logs in to his/her account, he/she will be able to see information for each property.

In some embodiments, when information related to a particular property is updated from a worker's device 420, the server 410 may automatically generate a notification to the customer's device 430. In some embodiments, when the worker's device 420 updates the information related to a particular property, the device 420 may be configured to automatically generate a notification to the customer's device 430 directly. The dotted line 422 represents that there may be a direct communication between the worker's device 420 and the customer's device 430. For example, a text message may be sent from the worker's device 420 to the customer's device 430 whenever a task is completed or whenever a note or picture is added to the worker's device. Additionally, when the worker has completed all tasks and is ready to leave the property, the worker's device 420 may automatically generate a notification to the customer's device 430.

Further, when the customer 432 receives such a notification, he/she may inspect the record of the completed or uncompleted tasks. The customer's device 430 may allow the customer to interact with the notification in real-time. For example, when a completed task notification is sent to the customer 432, a simple "satisfied" question or other satisfaction question may be asked, and the customer 432 may simply tap a "yes" or "no" to indicate his/her satisfaction or provide a more substantive response. Alternatively, or in addition, if the customer 432 is not completely satisfied, the customer 432 may reopen the task, add a new task, or generate a note associated with the task, so that the worker 423 can see why the customer 432 is not satisfied, and the worker may then perform further work based on the customer's note. When the customer's feedback is in real-time, the worker 423 may still be at the property and may be able to immediately address issues without having to reschedule.

Further, the system may be capable of sending instructions and information, including warnings to the customers. For example, the instructions may include information for optimal results, e.g., "the area should not be watered for [a number of] hours" or "please keep pets and children off of the grass for [a number of hours]." The instruction may also provide directions to the customers, warning them to keep people and pets out of an area for a specified time period, and the reasons for such a directive, where treatments were performed. The instruction may also advise the customers regarding expected pest activity or presence as a result of particular services. The instructions or cautionary warnings may be automatically generated or manually entered based on the particular service performed.

Figure 5:
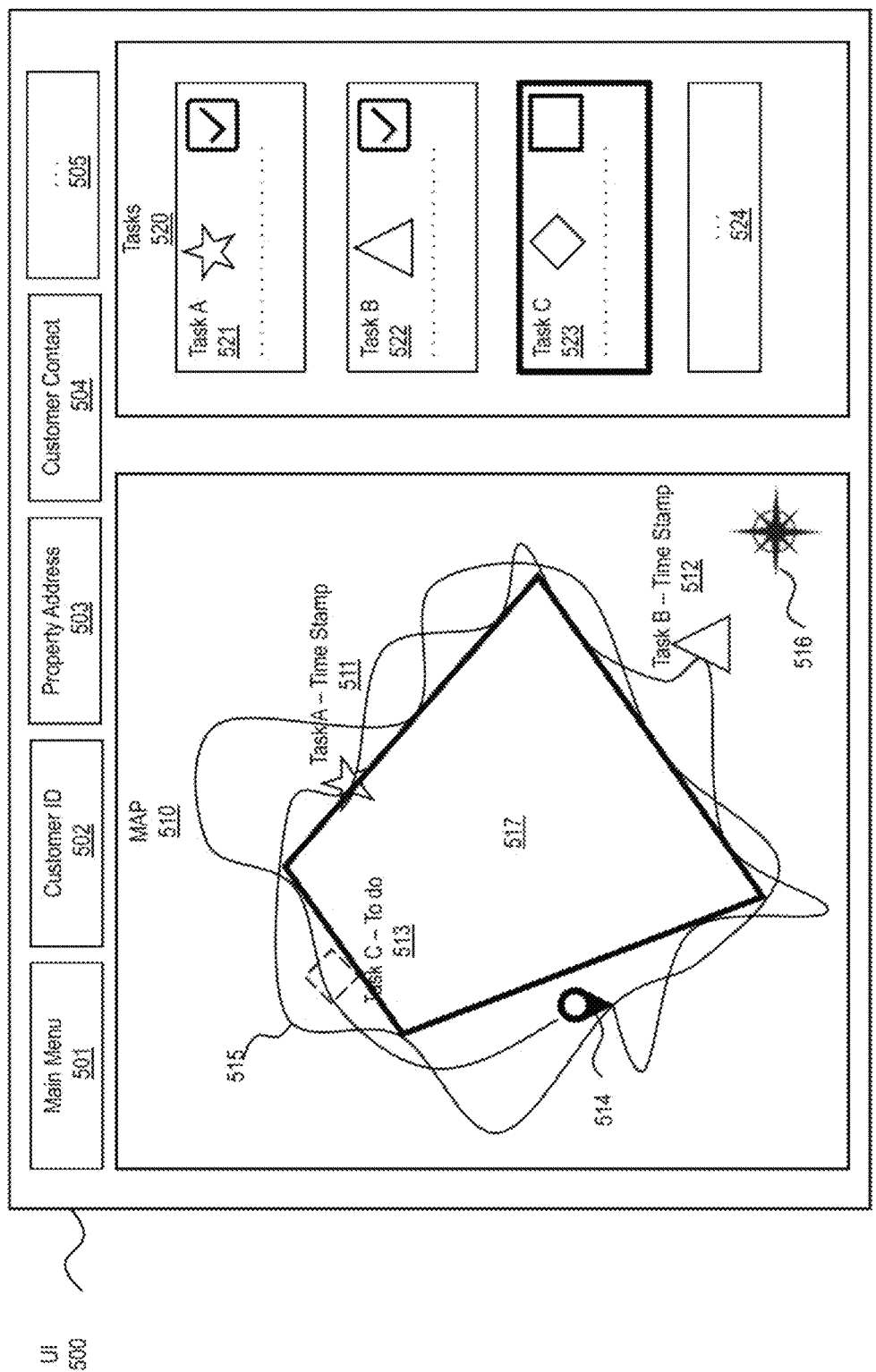
FIG. 5 illustrates an example user interface that displays multiple tasks, each of which is associated with a position or tracked movement on a map.
Figure 6:
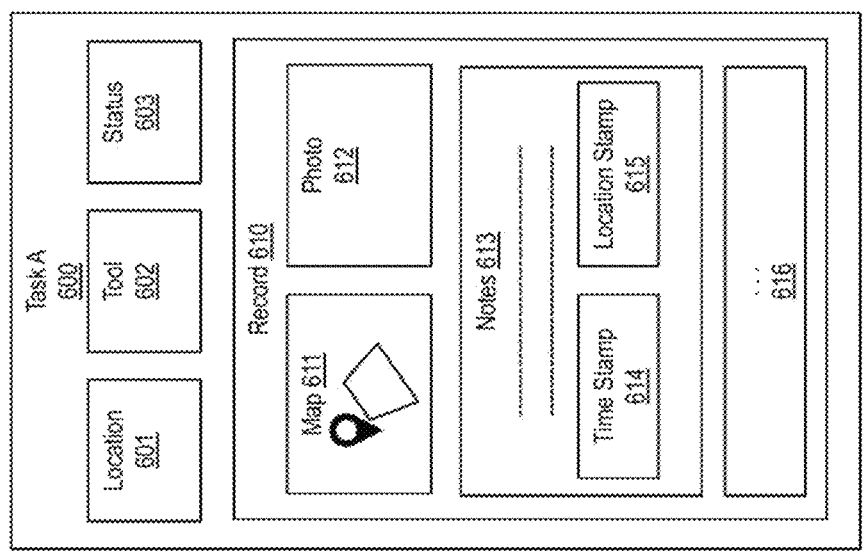
FIG. 6 illustrates an example user interface that displays detailed information related to a particular task.

FIGS. 5, 6, and 7 illustrate example user interfaces that may be implemented on the worker's devices (which may also be displayed on the device 201 of FIG. 2, worker's device 300 of FIG. 3 and/or worker's device 420 of FIG. 4), customer devices (which may be displayed at device 203 of FIG. 2 and/or the customer's device 430 of FIG. 4) and management and/or customer service devices (which may be displayed at the devices 203 and/or 204 of FIG. 2).

FIG. 5 is an example user interface (UI) 500, which may be displayed on a worker's device. The worker's device may correspond to the device 201 of FIG. 2, the worker's device 300 of FIG. 3 and/or the worker's device 420 of FIG. 4. The worker's UI 500 includes a main menu block 501, a customer ID 502, a physical address 503, and a customer contact block 504. The ellipsis 505 represents that there may be any number of blocks containing any relevant information displayed on the UI 500. The main menu block 501 may be a button that allows a user to navigate to a list of customers or tasks. FIG. 7 illustrates an example main menu UI 700. Each of the customer ID block 502, property address block 503, and the customer contact block 504 may be an information block that displays the respective selected customer's customer ID, the selected physical address, and the customer's contact information.

Further, customer contact 504 may also include URLs or other links that allow the worker to directly contact the customer. For example, customer contact 504 may include a URL to the customer's email address. In some embodiments, when the URL is clicked, an email app is opened with the customer's email address automatically filled in, and the worker only needs to enter the email content in the email app. In some embodiments, the customer contact block 504 may be a shortcut to send out an automatically generated email or text message to the customer. The automatically generated email or text message may include information related to the completed tasks. In some embodiments, the customer contact block 504 may be a shortcut button to the customer's telephone number. When the worker presses the button, the worker's phone may automatically dial the customer's telephone number.

Additionally, the UI 500 also includes a map area 510 and a task area 520. The map area 510 displays a map of an area that includes the customer's property 517. Line 515 represents the tracked movement of the worker's device. The mark 514 represents the current location of the worker's device. The mark 516 represents the orientation of the property and/or map. The star-shaped mark 511 represents a position tag associated with task A. The position tag may be generated when Task B is started or completed. Next to the position tag 511, a timestamp may also be displayed. In some embodiments, the timestamp may correspond to a time when task A starts. Alternatively, the timestamp may correspond to a time when task A is finished. In some embodiments, the timestamp may indicate both the start and completion times that correspond to task A. Similar to the star-shaped mark 511, the triangle mark 512 B represents a position tag associated with task B.

As another example, the diamond-shaped mark 513 represents that task C is not completed, but is a to-do task. The position of the mark 513 may be entered by a customer, or a customer service representative when the customer describes the project with the representative. For example, the customer may point out that siding at a particular side of the property needs to be repaired, and the customer service representative may mark the corresponding position on the map to record the customer's request. Before the task is performed, the task C may be displayed in a dotted line, colored in a different color, and/or marked as a different shape. After each task is completed, the color or line may change to indicate that the task is finished, and add timestamp(s) next to the completed task(s).

As illustrated in FIG. 5, different tasks may be marked on the map using different shapes or colored marks. In some embodiments, the tasks may be classified into different groups, and each group of tasks may be displayed on the map using a different mark. In some embodiments, different marks may be used to differentiate completed tasks, in-progress tasks, and to-do tasks.

The tasks area 520 lists multiple tasks that are associated with the property address 503, including task A 521, task B 522, and task C 523. The ellipsis 524 represents that there may be any number of tasks that are associated with the physical address 503, and any number of tasks may be displayed at the UI 500. Task A 521 includes a star-shaped mark, which represents an association with the location tag 511 on the map 510. Similarly, each of task B 522 and task C 523 includes a respective mark, representing a position tag 512 or 513 on the map, associated with the corresponding task.

Further, next to each of the tasks, there may be a checkbox. When the worker finishes each task, the worker may check the box to indicate that the task has been completed. When the checkbox is selected, the worker's device will automatically determine the current position of itself and generate a position tag on the map corresponding to its current position and the completed task. For example, task A 521 and task B 522 have been completed; thus, each of the checkboxes corresponding to task A 521 and task B 522 are checked. Task C 523 has not been completed, thus, the checkbox corresponding to task C 523 has not been checked.

Additionally, there may be a note function such that the worker can explain why a particular service was not performed, and when/if it will be performed later. For example, a backyard may not be treated due to the locked gate, the presence of a pet in the yard, or weather conditions. A note may be left indicating to the customer why the service was not performed, and providing instructions to the customer for when and how the service can be performed and rescheduled. The note may request that the customer contacts the company to reschedule the service, or may provide information on how to reschedule through an app or web site. The note may also set a return date for a worker to complete the unfinished task. When the notes are read by the customers, there may be an indicator that shows that the notes have been read. Furthermore, the customers may be able to reply to the instructions or notes. The system may suggest simple replies that customers can quickly select, such as "thank you," "will do," etc. The system may also provide a user with an option to confirm or deny the return date suggested by the worker.

Each of the tasks A, B, and C 521 through 523 may also include detailed descriptions and/or notes areas, represented by the dots. The detailed descriptions of the tasks may be entered by customers, a customer representative, or a worker. Workers may also enter additional notes while a task is being performed.

In FIG. 5, Task C 523 is shown in a darker block, which represents that task C 523 is currently selected. In some embodiments, when a task is selected, the worker's device may automatically determine that the task has started, and a position tag may be added to the map 510, denoting the starting location of the task. As mentioned above, when the task is finished, the checkbox is checked, triggering another position tag which records the final location of the task. The tracked movement of the worker's device between the start time and completion time may be associated with the corresponding task. Each portion of the tracked movement associated with a corresponding task may be marked as a different color, different thickness, and/or different line, e.g., dotted line, solid line, double line, etc.

Further, the user interface 500 or a similar user interface may be displayed to a customer. The customer's user interface may also display the worker's contact information, allowing the customer to quickly communicate with the worker. When the customer sees a task is in progress or is completed, the customer may provide additional requests or feedback to the worker while the worker is completing the task.

In some embodiments, tasks may be complex, and the users (including workers, customer service, and customers) may tap each of the tasks to enter another user interface that displays additional details related to the various tasks. FIG. 6 illustrates an example task user interface 600, which may be displayed after task A is selected.

The task A UI 600 includes a location block 601, a tool block 602, and a status block 603, each of which is a quick information block showing the relevant information corresponding to task A. For example, location block 601 may display a short description about the location (e.g., fence, backyard, front yard, siding, kitchen, etc.); the tool block 602 may display a short description about the tools required to complete task A (e.g., power washer, chemical A, trap, etc.); and the status block 603 may display the status of task A (e.g., to do, in progress, interrupted, completed, etc.). Alternatively, or in addition, each of the blocks 601 through 603 may also be a clickable button or link. When the user clicks the button, another user interface may be displayed to show additional information. For example, when the location button 601 is clicked, a map may be displayed; when the tool button 602 is clicked, a list of tools may be displayed; and when the status button 603 is clicked, additional details regarding the status of the job may be displayed.

The task A UI 600 also includes a record area 610, which further includes a map block 611, a photo block 612, and a note block 513. The map block 611 may display a smaller version of the map 510. When a user clicks the map block 611, a separate map UI (not shown) may be displayed to the user. The photo block 612 may display a thumbnail version of one or more photos taken by the worker or customer. For example, when the customer describes the task A, the customer may upload a photo to his/her account, which may be displayed at the photo block 612. Alternatively, or in addition, when the worker performs task A, the worker may also take pictures as a problem occurs or is resolved. When a user clicks the photo block 512, a separate photo UI (not shown) may be displayed to the user.

Similarly, the note block 613 may include a preview of a few lines of the most recently entered notes, or the subject line of multiple notes, and/or timestamp 614 and location stamp 615, which are associated with the time and/or location when the note was entered. When the note block 613 is clicked, the user may be taken to a separate note UI (not shown), which may show a complete list of notes entered by the workers, customers, and/or customer representatives. The ellipsis 16 represents that there may be additional blocks corresponding to additional information related to task A, which may be displayed at the UI 600.

As briefly described above, with respect to FIG. 5, the workers, customers, and/or service or management personnel may also navigate to a main menu button 501, which will show the user a list of customers and corresponding property addresses and tasks. FIG. 7 illustrates an example user interface 700, which may correspond to a user interface after a user clicks the main menu button 501.

Referring to FIG. 7, the UI 700 includes a back button 701 and a table 720. The table 720 lists multiple customers' information, including customer ID 702, customer name 703, property address 704, due date 705, assignment 706, tasks 707, and status 708. For example, the first row may include a customer with the customer ID 12345689 (709), the customer name as 703, the physical address as 704, and the due date as 705. Further, the assignment field 706 may include the assigned worker's name as worker A 713. In some embodiments, the assignment field 706 may include the worker's group name or a subcontractor's name. The tasks field 707 may include one or more specific tasks that are assigned to a particular worker. For example, the task may be property inspection 714, assigned to worker A. The status of the task may be completed on a particular date xx/xx/xxxx 715.

Further, there may be any number of customers and tasks stored in table 720. Thus, one screen does not have enough space to display all the customers and tasks. A scroll bar 730 may be displayed on a side of the screen to allow the user to scroll up and down the table 720. In some embodiments, a back arrow 715 and forward arrow 716 may be displayed at the bottom of the UI 700 to allow the user to navigate back and forth. A search field 740 may also be provided at the UI 700, enabling a user to search a particular property, customer, and/or task.

The following discussion refers to a number of methods and method acts that may be performed. Although the method acts may be used in a certain order or illustrated in a flow chart as occurring in a particular order, no particular order is required unless specifically stated or necessary due to one act depending on another act being completed prior.

Figure 8:
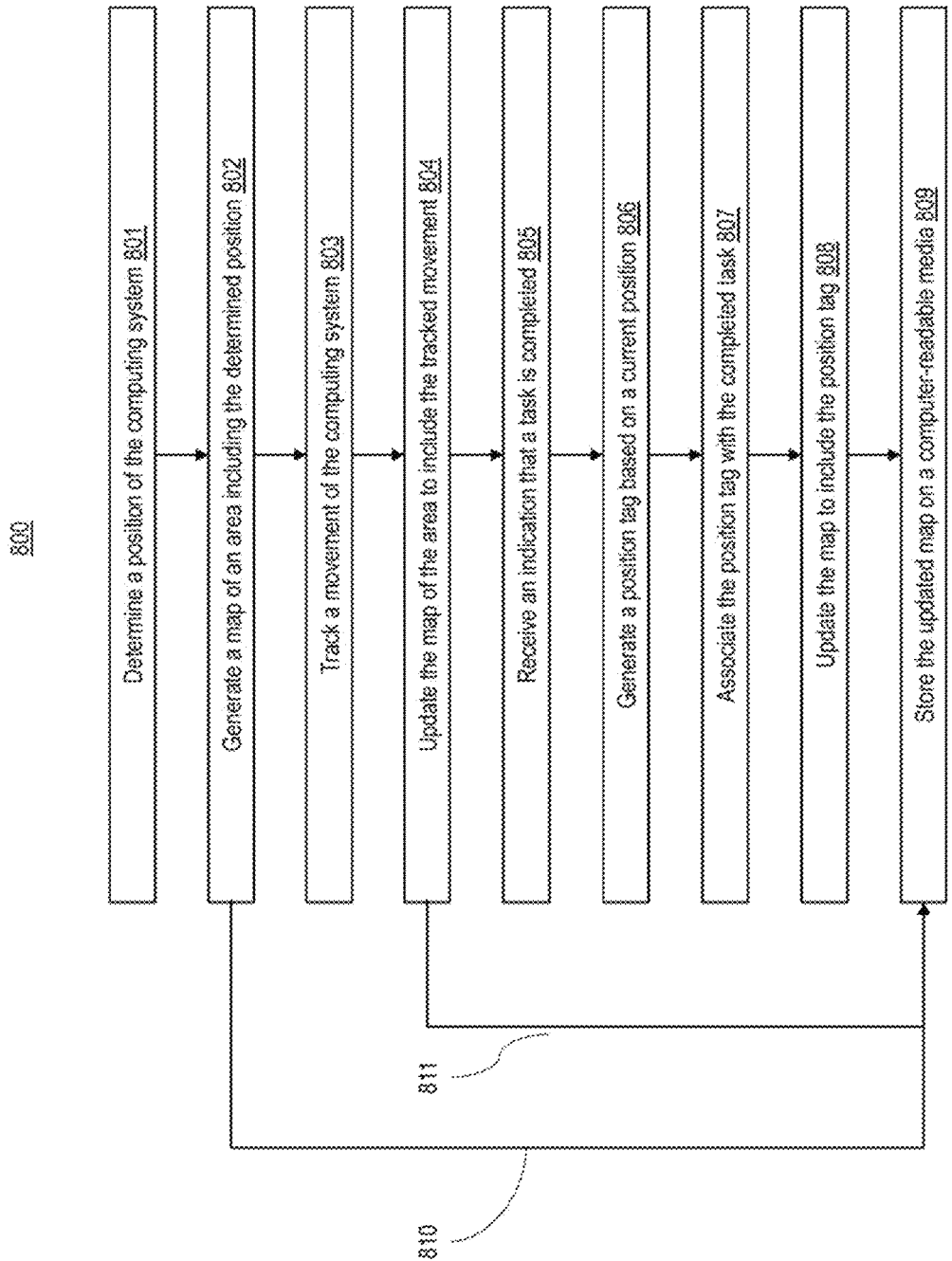
FIG. 8 illustrates a flowchart of an example method that may be implemented at a worker's mobile computing system.

FIG. 8 illustrates a flowchart of an example method 800 that may be implemented on a computing system that a worker carries while performing tasks. The computing system may correspond to the device 201 of FIG. 2, 300 of FIG. 3, and/or 420 of FIG. 4. For example, the computing system may be a mobile device, such as a mobile phone carried by a worker. The method 800 includes determining a position of the computing system (act 801). The method 800 also includes a generated map of an area that includes the determined position (act 802). As described above with respect to FIG. 3, the area may have a predetermined size, e.g., 100 ft.×100 ft., and have the determined position marked as the center of the area. In some embodiments, the area may be based on a boundary of the property that includes the determined location. The property boundary may be obtained from a separate data system, e.g., county property record.

The method 800 further includes tracking the movement of the computing system (act 803). As described above with respect to FIG. 3, the tracking of movement may be recording the position of the computing system at a predetermined frequency or interval, e.g., every second, every minute, etc. Alternatively, a new record of the position will be entered only when the computing system has moved a predetermined distance since the previous record.

The method 800 further includes updating the map of the area to include the tracked movement (act 804). Thereafter, an indication that the task is complete may be received (act 805). The completion indication may be entered by the worker who was performing the task and carrying the computing system. In response to the indication that the task is complete, a position tab based on the worker's current position may be generated (act 806). The position tag is then associated with the completed task (act 807), and the map may then be updated to include the position tag (act 808). The updated map may be stored on a computer-readable media (act 809). The additional arrow 710 and 811 represent that, at any time when the map is generated and/or updated, the generated or updated map may be stored (or backed up) on a computer-readable media (act 809). The computer-readable media may be a hard drive of a mobile device, e.g., storage 305 of FIG. 3. Alternatively, or in addition, the computer-readable media may be a remote storage that is hosted at a server, e.g., storage 411 of server 401 illustrated in FIG. 4.

Figure 9A:
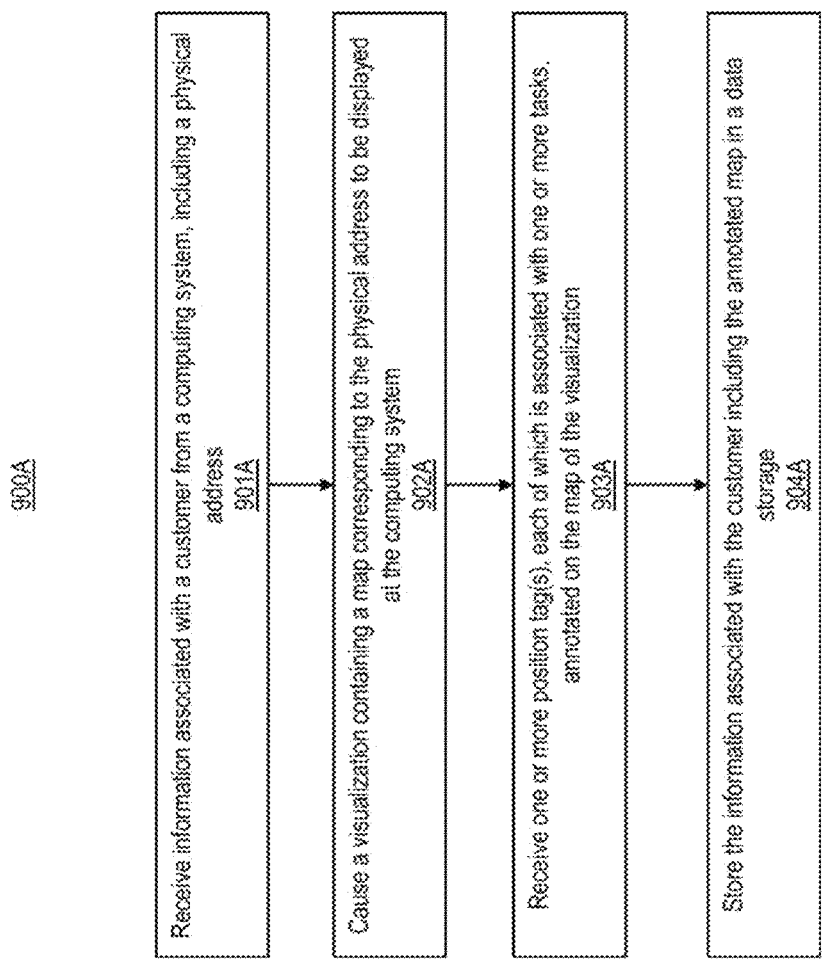
FIG. 9A illustrates a flowchart of an example method for receiving information associated with a customer from a computing system.

FIG. 9A illustrates a flowchart of an example method 900A for receiving an input of information associated with a customer from a computing system (e.g., a customer service device 440, a customer device 430 of FIG. 4A). The method 900A may be implemented at a computer server (e.g., server 410 of FIG. 4A). The method 900A includes receiving information associated with a customer from a computing system of customer service, including a physical address and customer preferences and tasks (act 901A). In response to receiving the physical address, the server causes a visualization containing a map corresponding to the physical address to be displayed at the computing system (act 902A). The visualization allows one or more position tags, each of which is associated with one or more tasks, to be annotated on the map via the computing system. After the server receives one or more position tags annotated on the map (act 903A), the server stores the information associated with the customer, including the annotated map in a data storage (act 904A).

Figure 9B:
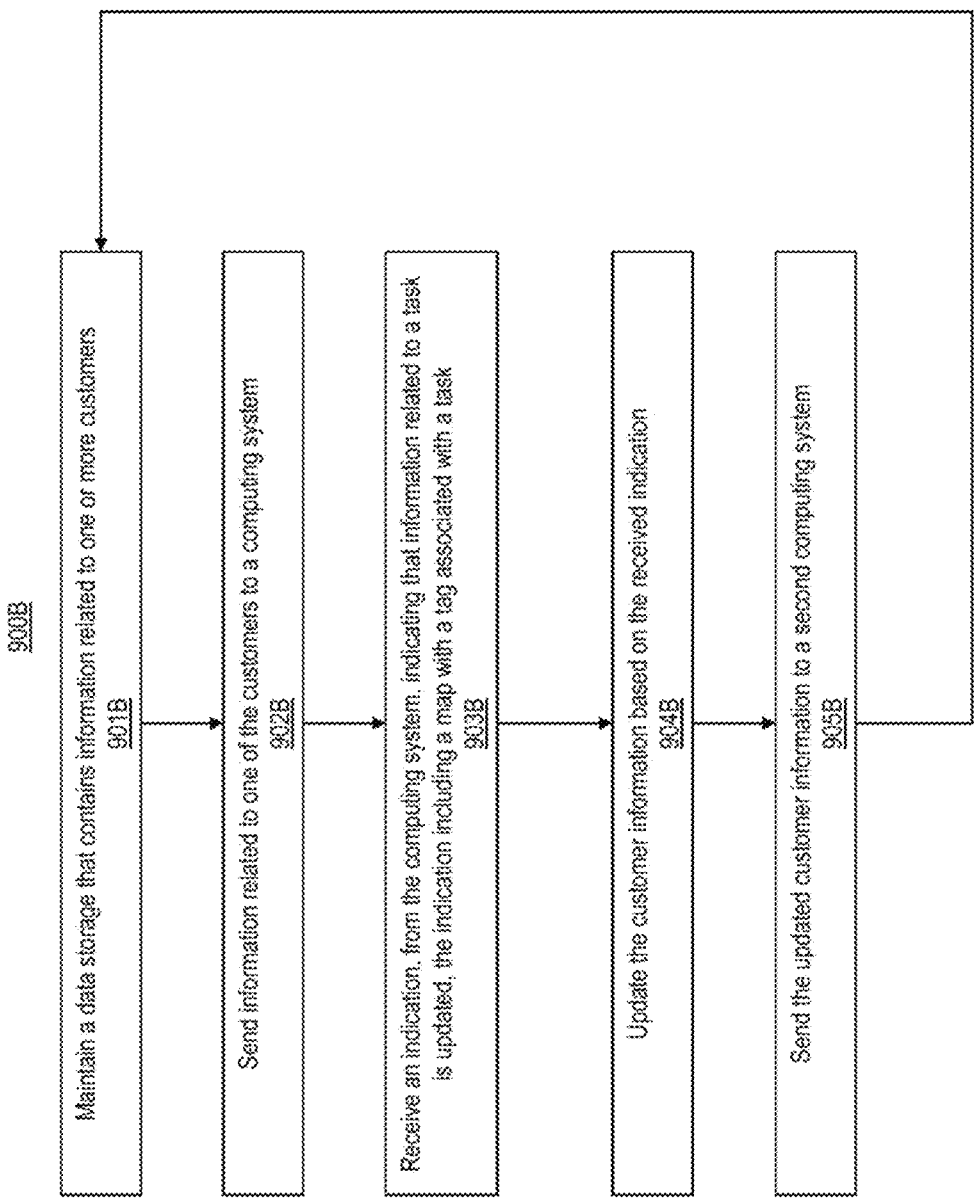
FIG. 9B illustrates a flowchart of an example method for updating information associated with a customer from a computing system.

FIG. 9B illustrates a flowchart of example method 900B for receiving update(s) from a computing system (e.g., a worker's device 420, a customer's device 430, or a customer service device 440 of FIG. 4A). The method 900B may also be implemented at a computer server (e.g., server 410 of FIG. 4A). The method 900B includes maintaining data storage that contains information related to one or more customers (act 901B). The data storage may correspond to the data storage 411 of FIG. 4A. The method 900B further includes sending information related to one of the customers to the computing system (act 902B).

The method 900B further includes receiving an indication from the computing system, indicating that information related to a task is updated (act 903B). For example, the worker performing the task may update the task information. Further, the customer may update the task information to add additional instructions or notes. The indication may include a map of the corresponding physical address and a position tag that is associated with the updated task. For example, a position tag related to beginning and completing the task may be generated by the worker. A position tag related to the task may also be generated by the customer.

In response to receiving the indication, the customer's information is then updated based on the received indication (act 904B). Then, the updated customer information may be sent to a second computing system (act 905B). For example, when the indication is generated from a worker's device, the second computing system may be a customer's device. Alternatively, when the indication is generated from a customer's computing system, the second computing system may be a worker's device.

Because the principles described herein may be performed in the context of a computing system, some introductory discussion of a computing system will be described with respect to FIG. 10. Then, this description will return to the principles of user interface, including sliding bars with respect to the remaining figures.

Computing systems exist in increasing variety. Computing systems may be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory, capable of having computer-executable instructions that may be executed by a processor. The memory may take any form and may depend on the nature and form of the computing system. A computing system may be distributed over a network environment and may include multiple constituent computing systems.

Figure 10:
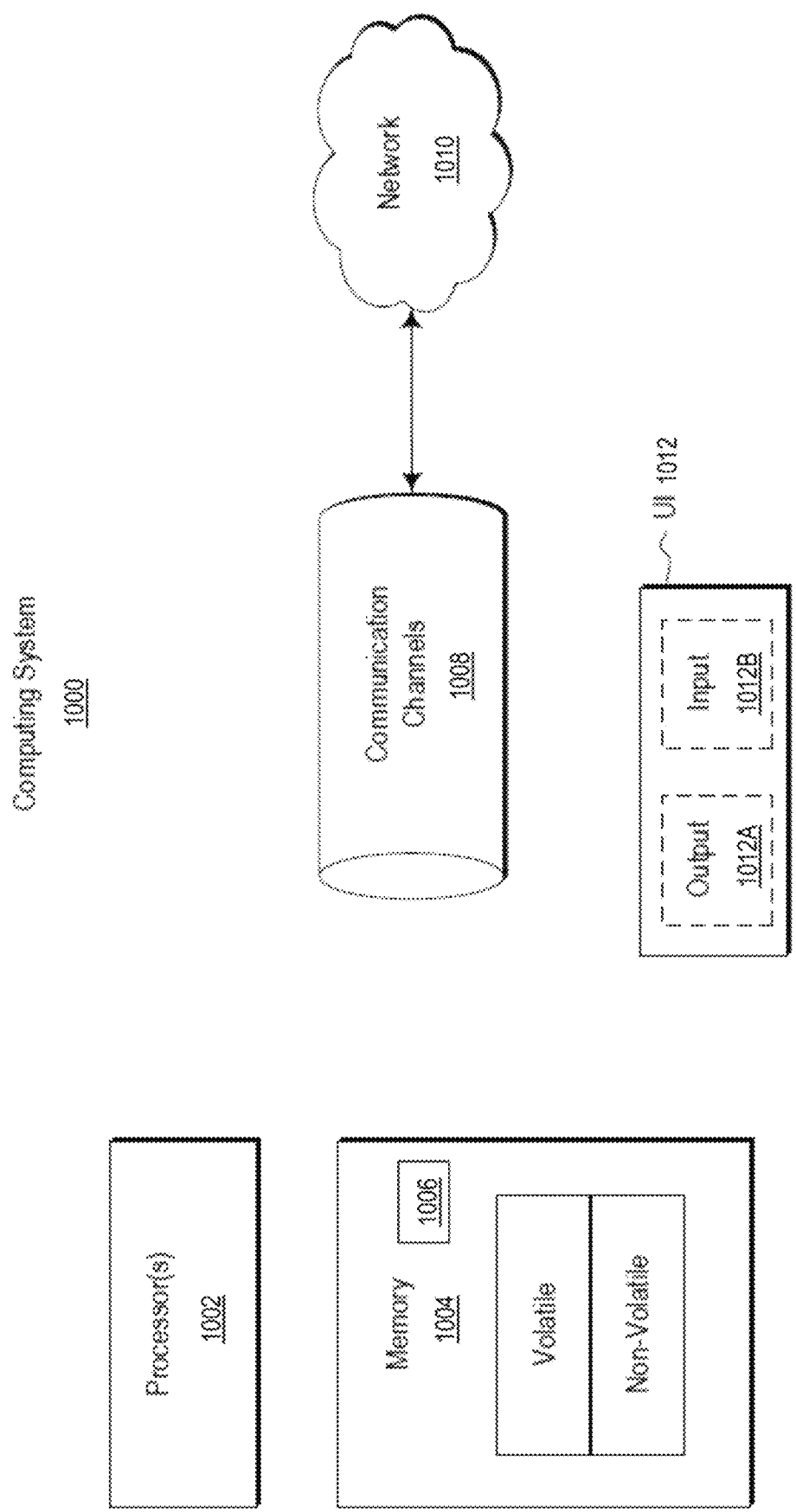
FIG. 10 illustrates an example computing system in which the principles described herein may be employed.

As illustrated in FIG. 10, in its most basic configuration, a computing system 1000 typically includes at least one hardware processing unit 1002 and memory 1004. The processing unit 1002 may include a general-purpose processor and may also include a field-programmable gate array (FPGA), an application-specific integrated circuit (ASIC), or any other specialized circuit. The memory 1004 may be physical system memory, which may be volatile, non-volatile, or some combination of the two. The term "memory" may also be used herein to refer to non-volatile mass storage such as physical storage media. If the computing system is distributed, the processing, memory, and/or storage capability may be distributed as well.

The computing system 1000 also has multiple structures, each often referred to as an "executable component". For instance, the memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, etc., that may be executed on the computing system, whether such an executable component exists in the heap of a computing system, or whether the executable component exists on computer-readable storage media.

In such a case, one of ordinary skill in the art would recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be organized to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hardwired logic gates, which are implemented exclusively, or near-exclusively, in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and also have a structure that is well-understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hardcoded or hardwired logic gates. The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, speakers, displays, tactile output, holograms and so forth. Examples of input mechanisms 1012B might include, microphones, touchscreens, holograms, cameras, keyboards, mouse of other pointer input, sensors of any type, and so forth.

Embodiments described herein may comprise or utilize a special purpose or general-purpose computing system including computer hardware, such as one or more processors and system memory, as discussed in greater detail below. Embodiments described herein also include physical and other computer-readable media for carrying or storing computer-executable instructions and/or data structures. Such computer-readable media can be any available media accessible by a general purpose or special purpose computing system. Computer-readable media that store computer-executable instructions are classified as physical storage media. Computer-readable media that carry computer-executable instructions are classified as transmission media. Thus, by way of example and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

For example, computer-executable instructions comprise instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be binaries, or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as examples of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where both local and remote computing systems, which are linked (either by hardwired data links, wireless data links, or by a combination of hardwired and wireless data links) through a network, perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems, which may correspond to the computing system 1000 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud, or that implement aspects of cloud computing. The various components or functional blocks may be implemented as software, hardware, or a combination of the two. The computing systems of the remaining figures may include more or less than the components illustrated in the figures, and some of the components may be combined as circumstances warrant. Although not necessarily illustrated, the various components of the computing systems may access and/or utilize a processor and memory, such as processor 1002 and memory 1004, as needed to perform their various functions. cm What is claimed is:

What is claimed is:

1. A mobile computing system for managing tasks related to property improvement or maintenance services, comprising:
   one or more processors; and
   one or more computer-readable media having stored thereon computer-executable instructions that are structured such that, when executed by the one or more processors, cause the mobile computing system to be configured to:
   determine a position of the mobile computing system;
   generate a map of an area including the determined position;
   render on the map one or more annotations received from a second user indicating a first location at a property associated with a first task created by the second user and a second location at a property associated with a second task created by the second user, wherein the first task comprises an application of a chemical to the first location;
   track a movement of the mobile computing system around the first location;
   based upon the movement of the mobile computing system around the first location, generate a size of a first area;
   receive an electronic indication of a chemical that is to be used during the first task;
   calculate an amount of the chemical that is to be used during the first task based upon the generated size of the first area and the chemical that is to be used during the first task;
   update the map of the area to include:
   the tracked movement associated with the first task in a first color, and the chemical and the amount of the chemical that was used during the first task;

receive an indication that the first task is completed;
update the map with a position tag indicating that the first task is complete;
in response to the first task being determined to be complete, provide the user with a second task to complete,
wherein the system automatically prevents providing the user the second task until the first task is determined to be complete;
update the map of the area to include the tracked movement associated with the second task in a second color;
receive an indication that the second task is completed; and
send the updated map and information related to the first task and the second task to the second user for viewing.

2. The mobile computing system of claim 1, wherein the one or more computer-readable media includes a cloud storage.

3. The mobile computing system of claim 1, wherein the mobile computing system is further configured to:
receive an indication that the first task is started and associate a current position with a starting point of the first task; and
associate a portion of the tracked movement between the starting point and a completion point with the first task, so that the portion of the tracked movement corresponds to a path of the movement of the mobile computing system during a period of time when the first task was being performed.

4. The mobile computing system of claim 3, wherein the portion of the tracked movement is colored in a different color or a different font from a remainder of the tracked movement.

5. The mobile computing system of claim 1, the mobile computing system further configured to:
display information related to a customer, the information including a property address corresponding to the customer; and
determine that the property address matches a current location of the mobile computing system.

6. The mobile computing system of claim 5, the mobile computing system being further configured to:
access a cloud storage that contains information related to one or more customers;
retrieve a particular customer's information, which includes at least one or more physical addresses, and each of the physical addresses corresponding to one or more tasks; and
display at least one of the one or more physical addresses and the corresponding one or more tasks.

7. The mobile computing system of claim 6, the mobile computing system further configured to update the particular customer's information stored at the cloud storage to include the generated map and the completed task.

8. The mobile computing system of claim 7, the mobile computing system further configured to:
receive an input of information related to the particular customer, cause the input of information to be sent to a third mobile computing system that the customer has access to.

9. The mobile computing system of claim 6, the mobile computing system further configured to:
determine that the first location of the mobile computing system matches a customer's physical address at the cloud storage.

10. The mobile computing system of claim 1, wherein the electronic indication comprises a picture of the chemical.

11. The mobile computing system of claim 1, wherein the electronic indication comprises a barcode scan.

12. A computer implemented method implemented at a mobile computing system for generating maps related to tasks that are to be performed or being performed by service providers, comprising:
determining a location of the mobile computing system;
generating a map of an area including the determined location;
rendering on the map one or more annotations received from a second user indicating a first location at a property associated with a first task created by the second user and a second location at a property associated with a second task created by the second user, wherein the first task comprises an application of a chemical to the first location;
tracking a movement of the mobile computing system around the first location;
based upon the movement of the mobile computing system around the first location, generating a size of a first area;
receiving an electronic indication of a chemical that is to be used during the first task;
calculate an amount of the chemical that is to be used during the first task based upon the generated size of the first area and the chemical that is to be used during the first task;
updating the map of the area to include:
the tracked movement associated with the first task in a first color, and the chemical and the amount of the chemical that was used during the first task;
receiving an indication that the first task is completed;
updating the map with a position tag indicating that the first task is complete;
in response to the first task being determined to be complete, providing the user with a second task to complete, wherein the user is automatically prevented from being provided the second task until the first task is determined to be complete;
updating the map of the area to include the tracked movement associated with a second task in a second color;
receiving an indication that the second task is completed; and
sending the updated map and information related to the first task and the second task to the second user for viewing.

13. The computer implemented method of claim 12, wherein the electronic indication comprises a picture of the chemical.

14. The computer implemented method of claim 12, wherein the electronic indication comprises a barcode scan.

* * * * *